United States Patent
Halter et al.

(10) Patent No.: US 8,663,536 B2
(45) Date of Patent: Mar. 4, 2014

(54) HYBRID INJECTION ACTUATOR FOR AN INJECTION MOLDING MACHINE

(75) Inventors: Christophe Halter, Selange (BE); Pierre Glaesener, Bissen (LU); Claude Hostert, Hassel (LU); Roman Pirog, Caledon East (CA)

(73) Assignee: Husky Injection Molding Systems Ltd., Bolton, Ontario (CA)

(*) Notice: Subject to any disclaimer, the term of this patent is extended or adjusted under 35 U.S.C. 154(b) by 0 days.

(21) Appl. No.: 13/580,483

(22) PCT Filed: Feb. 8, 2011

(86) PCT No.: PCT/CA2011/050069
§ 371 (c)(1),
(2), (4) Date: Aug. 22, 2012

(87) PCT Pub. No.: WO2011/116477
PCT Pub. Date: Sep. 29, 2011

(65) Prior Publication Data
US 2013/0001829 A1    Jan. 3, 2013

Related U.S. Application Data

(60) Provisional application No. 61/316,440, filed on Mar. 23, 2010.

(51) Int. Cl.
*B29C 45/50*    (2006.01)
(52) U.S. Cl.
USPC ........................ 264/328.1; 425/587
(58) Field of Classification Search
USPC ............. 264/328.1, 40.5, 40.7; 425/587, 145, 425/149
See application file for complete search history.

(56) References Cited

U.S. PATENT DOCUMENTS

| 4,601,653 A * | 7/1986 | Inaba ............................ 425/587 |
| 5,714,176 A | 2/1998 | Würl et al. |
| 5,747,076 A | 5/1998 | Jaroschek et al. |
| 6,120,277 A | 9/2000 | Klaus |
| 7,004,742 B2 | 2/2006 | Ickinger |
| 2003/0185932 A1 | 10/2003 | Chromy et al. |

FOREIGN PATENT DOCUMENTS

| EP | 2243600 | 10/2010 |
| WO | 0204193 A1 | 1/2002 |

OTHER PUBLICATIONS

PCT International Search Report; Ristovski, Branka; Jun. 17, 2011; 3 pages.

* cited by examiner

*Primary Examiner* — Jill Heitbrink
(74) *Attorney, Agent, or Firm* — Husky Intellectual Property Services

(57) ABSTRACT

An extruder unit (22) for an injection molding system (20) includes a piston (48), slidably located within a piston chamber (42), and is movable between a retracted position and an extended position. The piston (48) is further adapted to rotatably mount a screw (30). A motor assembly (36) is mounted to the piston housing (40) and operable to rotate the screw (30). The piston (48) is translated by a hybrid injection actuator (38), the hybrid injection actuator (38) including: a drive unit (50) operable to move the piston (48) between the retracted position and the extended position; and a gas pressure unit (93), operable to provide a boosting force to the piston (48), thereby urging the piston (48) towards the extended position.

20 Claims, 7 Drawing Sheets

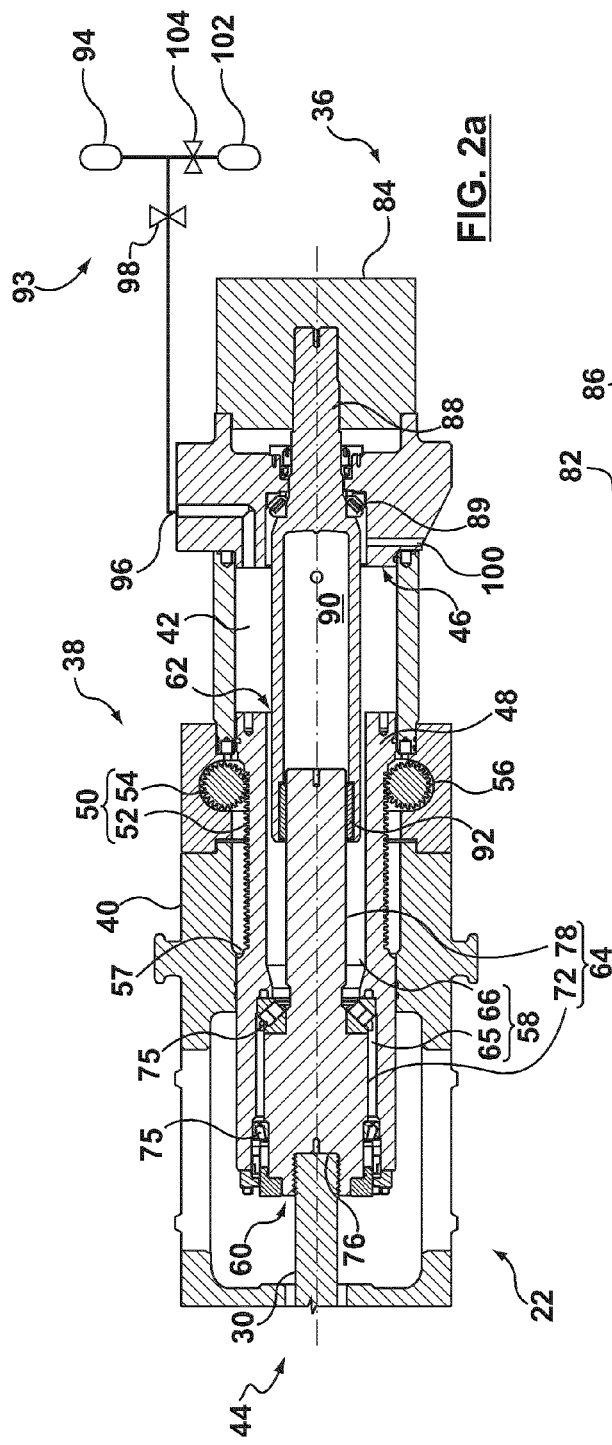
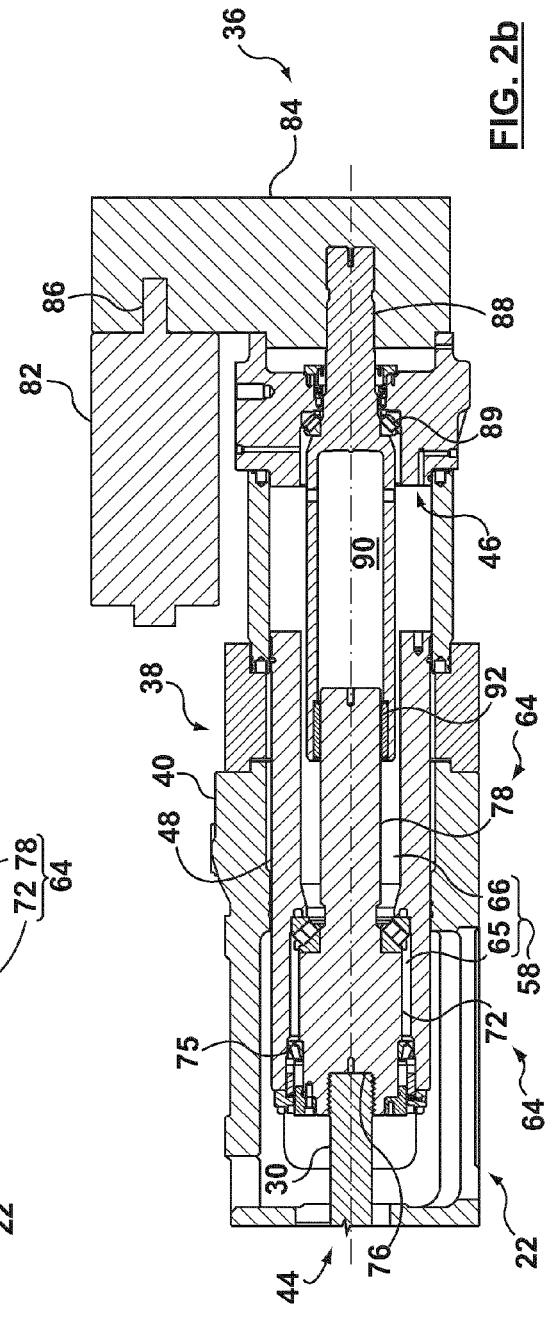
FIG. 2a
FIG. 2b

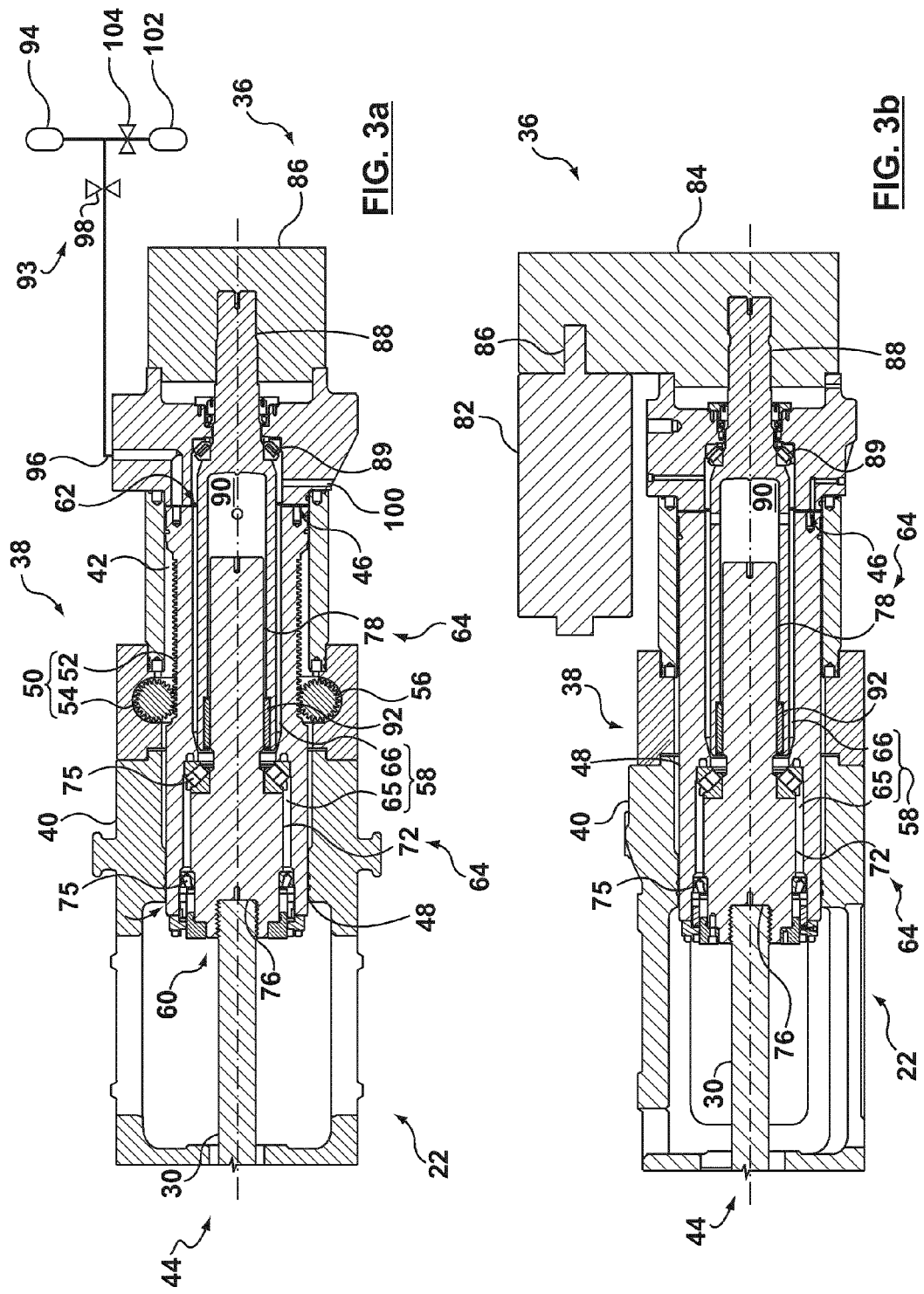

HYBRID INJECTION ACTUATOR FOR AN INJECTION MOLDING MACHINE

TECHNICAL FIELD

The present relates to injection molding systems. More specifically, the present relates to a hybrid injection actuator for an injection molding system.

BACKGROUND

Some examples of known injection molding systems are: (i) the HyPET™ Molding System, (ii) the Quadloc™ Molding System, (iii) the Hylectric™ Molding System, and (iv) the HyMet™ Molding System, all manufactured by Husky Injection Molding Systems, Ltd. of Bolton, Ontario, Canada. These injection molding systems include components that are known to persons skilled in the art and these known components will not be described here; these known components are described, by way of example, in the following references: (i) Injection Molding Handbook by Osswald/Turng/Gramann ISBN: 3-446-21669-2; publisher: Hanser, and (ii) Injection Molding Handbook by Rosato and Rosato ISBN: 0-412-99381-3; publisher: Chapman & Hill. Injection molding systems typically include an injection actuator to motive a reciprocating screw or plunger.

US patent application 2003/0185932A1 (published 2003-10-02) to CHROMY et al, teaches an injection screw drive for a plastic injection molding machine comprising axes (A1, A2) respectively provided for the rotational and for the axial motion of the injection screw (4). According to the invention, the injection screw drive has at least one double rack rail overdrive for effecting the axial motion. The injection worm drive is configured as a gear combination having at least two drive motors (18, 44) and an output axle. The gear combination has, as a core, a gear block with a gear casing (42), to which at least two reducing gears are connected that effect the rotational and the axial motion of the injection screw (4). This enables the entire machine to be provided with a short and compact structure insofar as this concerns the injection aggregate. According to a second embodiment, both drives have separate housings. The entire injection unit rests, in a known manner, on the machine stand (33) via guide rails (32) such that it can be displaced.

U.S. Pat. No. 7,004,742 to Ickinger (issued 2006-02-28) teaches a linear drive for an injection molding machine including a housing defining a sealed interior space containing a gas volume. The housing has two housing portions constructed for telescopic movement within one another. A spindle drive is accommodated in the housing and operated by the electric motor. The spindle drive includes a spindle shaft, which is axially securely fixed to one of the housing portions, and a spindle nut, which is arranged on the spindle shaft and axially securely fixed to the other one of the housing portions. Acting on the spindle drive is an energy accumulator which is constructed for discharge in a first operating cycle which is energy-intensive and for recharging in a second operating cycle which is opposite to the first operating cycle and requires little energy.

SUMMARY

According to a first aspect, there is provided an extruder unit for an injection molding system, comprising
 a barrel containing a screw;
 a piston housing, connected to and in communication with the barrel, the piston housing defining a piston chamber;
 a piston, slidably located within the piston chamber, and movable between a retracted position and an extended position; the piston rod further being adapted to rotatably mount the screw;
 a motor assembly, mounted to the piston housing and operable to rotate the screw; and
 a hybrid injection actuator, the hybrid injection actuator including:
  an drive unit operable to move the piston rod between the retracted position and the extended position;
  a gas pressure unit, coupled to the electro/hydro-drive unit via a gas conduit, the gas pressure unit being operable to provide a boosting force to the piston rod to urge the piston rod towards the extended position; and
  a lock valve located between the gas pressure unit and the piston chamber, the lock valve being movable between an open position and a closed position to provide a selective communication between the gas pressure unit and the piston rod.

According to a second aspect, there is provided a method for operating an extruder unit of an injection molding system having a screw rotatably mounted to a extensible piston movably located within a piston chamber defined by a housing, the method comprising:
 actuating the piston rod located in the piston chamber by engaging an electro/hydro-drive unit to translate the piston rod to an extended position;
 selectively connecting a source of gas pressure to the piston chamber to provide a boosting force to the piston rod while the screw is being translated to the extended position by releasing a gas stored at a first pressure from the external source of gas pressure; and
 retracting the screw back to a retracted position using the electro/hydro-drive unit; and
 wherein retracting the screw back to the retracted position within the piston chamber recharges the external source of gas pressure back to the first pressure.

According to a third aspect, there is provided a hybrid injection actuator for an extruder unit of an injection molding system, comprising
 a piston rod, slidably located within a piston chamber on the extruder unit, and movable between a retracted position and an extended position; the piston rod further being adapted to rotatably mount a screw;
 a drive unit operable to move the piston rod between the retracted position and the extended position; and
 a gas pressure unit, operable to provide a boosting force to the piston rod, thereby urging the piston rod towards the extended position.

BRIEF DESCRIPTION OF THE DRAWINGS

Embodiments will now be described with reference to the accompanying drawings in which:

FIGS. 2a and 2b are top and side sectional views, respectively of an embodiment of an extruder unit for the injection molding system of FIG. 1, shown in an extended position;

FIGS. 3a and 3b are top and side sectional views, respectively of the extruder unit of FIG. 2, shown in a retracted position;

DETAILED DESCRIPTION OF THE EMBODIMENTS

Figure 1:
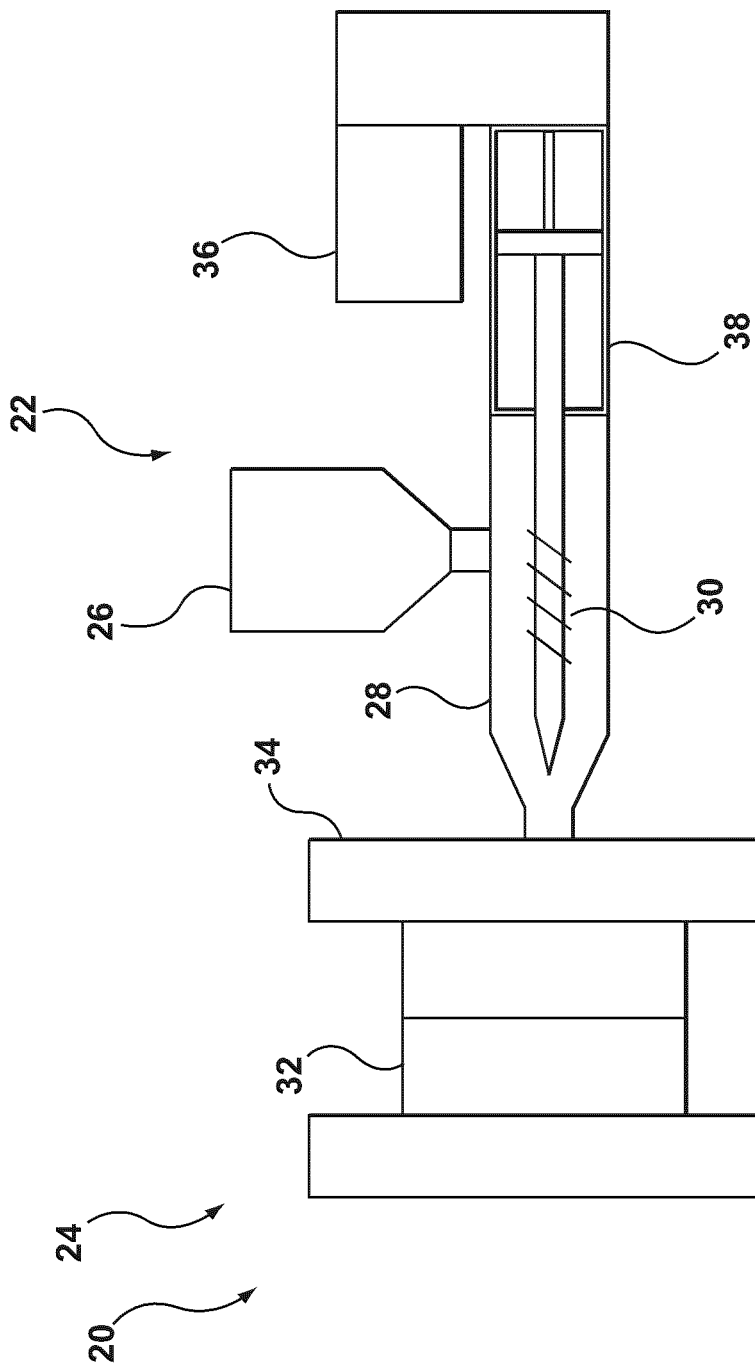
FIG. 1 is a simplified side view of an injection molding system.

Referring now to FIG. 1, an embodiment of an injection molding machine is shown generally at 20. Injection molding system 20 includes an extruder unit 22 and a clamping unit 24, the extruder unit 22 and the clamping unit 24 being operable to cooperate and produce a molded article (not shown). Clamping unit 24 includes a mold assembly 32, which is mounted to platens 34 as well as a mold stroke actuator (not shown) and a clamp actuator (also not shown).

The extruder unit 22 includes a hopper 26, attached to a barrel 28. A screw 30 is rotatably and translatably located within the barrel 28, and is operable to plasticize and express resin within barrel 28. The hopper 26 is coupled to a feed throat of the extruder unit 22 so as to deliver pellets of moldable material to the extruder unit 22. The extruder unit 22 is configured to: (i) process the pellets into an injectable molding material, and (ii) inject the injectable material into the clamping unit 24. An HMI (not shown) is coupled to control equipment, and is used to assist an operator in monitoring and controlling operations of the injection molding system 20. In the presently-illustrated embodiment, screw 30 is rotated by a motor assembly 36, and translated by a hybrid injection actuator 38 (described in greater detail below), which provides both electrical and gas-powered translation of screw 30. Alternatively, the extruder unit 22 could be a two stage injection unit having a non-translating screw and a shooting pot that is translated by the hybrid injection actuator 38.

Referring now to FIGS. 2a-2b and 3a-3b, hybrid injection actuator 38 and motor assembly 36 for extruder unit 22 are shown in greater detail. As will be described in greater detail below, hybrid injection actuator is operable to move screw 30 between a retracted position (FIGS. 3a and 3b) and an extended position (FIGS. 2a and 2b).

Hybrid injection actuator 38 includes a piston housing 40 that defines a piston chamber 42. Piston housing 40 can be integrally formed as a single component, or, as is shown in the currently-illustrated embodiment, can include multiple sections which are formed separately and then assembled together. Piston chamber 42 is open at a first end 44 (i.e., open towards barrel 28) and a second end 46 (i.e., open towards motor assembly 36). First end 44 is in communication with barrel 28 (FIG. 1) and second end 46 is in communication with motor assembly 36.

Translatably located within piston chamber 42 is a piston 48. Piston 48 is operable to be translated between the extended position (FIGS. 2a and 2b) and the retracted position (FIGS. 3a and 3b) by a drive unit 50. In the presently-illustrated embodiment, drive unit 50 includes a rack and pinion to move the piston 48 between the extended and retracted positions. Specifically, piston 48 defines at least one rack portion 52 that is adapted to mesh with at least one pinion 54 located in the piston housing 40 (FIGS. 2a and 3a). In the presently-illustrated embodiment, piston 48 includes a pair of rack portions 52 and a pair of pinions 54, each located on opposing sides of the piston 48. Pinions 54 are rotatably mounted within pinion niches 56 formed in the piston housing 40. In the currently-illustrated embodiment, pinions 54 are electrically-driven and can motivate the piston 48 between its retracted and extended positions when engaged. Alternatively, pinions 54 could be hydraulically-driven. The range of travel of piston 48 is delimited by the abutment of an end of piston 48 against sidewalls formed in the piston housing 40, such as sidewall 59 that is proximate the second end 46 (best seen in FIGS. 3a and 3b).

Piston 48 is hollow and defines within its interior a rod chamber 58. Rod chamber 58 is open at a first end 60 (i.e., open towards barrel 28) and a second end 62 (i.e., open towards motor assembly 36). Rod chamber 58 includes a head section 65 proximate the first end 60 and a shaft section 66 proximate second end 62. Head section 65 is in communication with shaft section 66. In the illustrated embodiment, the shaft section 66 is narrower in diameter than head section 65.

Coaxially mounted within rod chamber 58 upon bearings 75 is a screw adaptor 64, which is adapted for receiving an end of screw 30. Screw adaptor 64 includes a head portion 72 located within head section 65 and a shaft portion 78 located within shaft section 66. Head portion 72 is sized as to be able to rotate freely within head section 65, but is prevented from translating relative to piston 48 by the shape of piston 48. Head portion 72 includes a screw mounting hole 76 that is adapted to mount an end of screw 30, so that the screw 30 and the screw adaptor 64 are kinematically coupled together. Head section 65 is partially filled with oil or other such lubricant (none shown) to reduce friction while screw adaptor 64 is rotating. Seals (not shown) are located within sidewalls 68 to prevent leakage of the lubricant.

The above described configuration of piston 48 and screw adaptor 64 permits the free rotation of the screw adaptor 64/screw 30 within the non-rotating piston 48. This configuration further permits the free translation of piston 48 within piston chamber 42 between its extended position (FIGS. 2a and 2b) and retracted position (FIGS. 3a and 3b) which thereby translates both screw adaptor 64 and screw 30. The extended and retracted positions of piston 48 correspond to the position of screw 30 during inject and recovery phases of the injection cycle (described in greater detail below), respectively, and are typically defined by hard stops defined by rod housing 42.

As will be described in greater detail below, screw adaptor 64 is adapted to be rotatably driven by motor assembly 36. Radially spaced around the circumference of shaft portion 78 is at least one spline groove (not shown) for receiving torque from motor assembly 36 (described in greater detail below). In the currently-illustrated embodiment, the at least one spline groove includes a plurality of spline grooves (also not shown) that are radially spaced along the circumference of shaft portion 78.

Motor assembly 36 is mounted to piston housing 40 and includes an electric motor 82 that is operable to rotate screw adaptor 64 via a transmission assembly 84. Alternatively, a hydraulic motor could be used to rotate screw adaptor 64. In the presently-illustrated embodiment, transmission assembly 84 is a gearbox that couples an output shaft 86 on electric motor 82 to a drive shaft 88 so that energizing motor assembly 36 rotates drive shaft 88. Drive shaft 88 extends from gearbox 86 through the second end 46 of piston housing 40 into piston chamber 42. Bearings 89 are mounted to piston housing 40 proximate the second end 46 to help support the rotation of drive shaft 88.

Drive shaft 88 is hollow and defines on its interior a shaft chamber 90 that is open at the distal end of drive shaft 88 (i.e., open towards barrel 28). Shaft chamber 90 is adapted to receive shaft portion 78 of screw adaptor 64, and further includes at least one spline 92 that extends inwards and is adapted to mesh with the at least one spline groove. In the currently-illustrated embodiment, the at least one spline 92 includes a plurality of splines 92, one spline 92 for each spline groove. The interface of spline grooves with the splines 92 permits the transmission of torque from drive shaft 88 to screw adaptor 64 (and thus to the coupled screw 30). Each spline groove 80 is generally at least as long as the maximum distance of travel between the extended and the retracted positions of piston 48 so that the splines 92 remain in positive contact with the spline grooves to provide rotational force. Although the currently-illustrated embodiment shows the spline grooves on the shaft portion 78 of screw adaptor 64 and splines 92 located along shaft chamber 90, those of skill in the art will recognize that this arrangement could be reversed.

Although the piston 48 is adapted to be translated by electrical or hydraulic power (via rack portions 52 and pinions 54), it is further operable to act as a gas-actuated piston. The cylinder side of piston chamber 42 is in selective communication with an external source of gas pressure. In the illustrated embodiment, the external source of gas pressure for extruder unit 22 is a gas pressure unit 93. Gas pressure unit 93 includes at least one pressure bottle 94 in communication with the cylinder side of piston chamber 42 via gas conduit 96. Pressure bottle 94 provides a source of gas, such as nitrogen gas or other suitable pressured gas source, that is compressed to a first pressure (say, for example, 130 bar) which is higher than the default pressure of piston chamber 42. In the presently-illustrated embodiment, nitrogen gas will be provided as the example. A lock valve 98 is provided along gas conduit 96 between pressure bottle 94 and rod chamber 58 to provide selective communication between the two. When lock valve 98 is moved into an open position, the first pressure of pressure bottle 94 is discharged and the nitrogen gas enters piston chamber 42 applying a boosting force to piston 48 to urge the piston 48 towards its extended position. During normal operations, lock valve 98 is maintained in the open position. When piston 48 is retracted by the pinions 54 back to the retracted position, the change in volume within rod chamber 58 displaces the nitrogen gas back into pressure bottle 94, recharging it back to the first pressure. In the presently-illustrated embodiment, a pressure transducer 100 is located within piston housing 40 to measure the current pressure of the gas within rod chamber 58. Those of skill in the art will recognize that the location of pressure transducer 100 is not particularly limited, and the pressure transducer 100 can be located elsewhere, such as along gas conduit 96.

Also selectively connected to gas conduit 96 is at least one recharge bottle 102. Recharge bottle 102 provides a recharge pressure source and, in the presently-illustrated embodiment, is another nitrogen-filled bottle stored at a second pressure, the second pressure being higher than the first pressure (say, for example, 220 bar). A recharge valve, such as analog valve 104 is provided along gas conduit 96 between recharge bottle 102 and piston chamber 42, and is operable to move between an open and the closed position. Analog valve 104 is opened whenever pressure transducer 100 detects a lower-than-desired pressure within piston chamber 42. By moving analog valve 104 towards the open position by a proportional amount, recharge bottle 102 is operable to compensate for any pressure loss due to leakage of the nitrogen gas out of piston chamber 42 or gas conduit 96 so that the piston 48 receives a consistent pressure boost. When analog valve 104 is in the closed position, recharge bottle 102 can be replaced and/or refilled without interrupting the cyclical injection operation of extruder unit 22.

Figure 4:
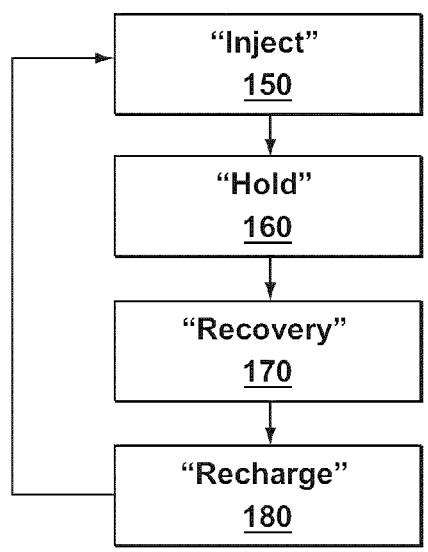
FIG. 4 is a flowchart for a method of an injection cycle for the extruder unit of FIGS. 2 and 3.

Referring now to FIG. 4, a method for operating extruder unit 22 through an injection cycle is shown, beginning at step 150. At step 150, extruder unit 22 is in its "Inject" phase and injects molten material stored in barrel 28 into the mold assembly 32 held shut by the clamping unit 24 (FIG. 1). Pinions 54 translate piston 48 towards its extended position (FIGS. 2a and 2b), which pushes screw 30 forward to express the molten material stored in barrel 28. Lock valve 98 is in the open position.

At step 160, extruder unit 22 is in its "Hold" phase where screw 30 is held in its nearly extended position (FIGS. 2a and 2b). The boosting force provided by the pinions 54 and the nitrogen gas within piston chamber 42 act to substantially hold piston 48 towards the extended position.

At step 170, extruder unit 22 is in its "Recovery" phase. The melt pressure within barrel 28 at the tip of screw 30 translates piston 48 rearwards towards its retracted position (FIGS. 3a and 3b). The translation of piston 48 rearwards within piston chamber 42 recompresses the nitrogen within pressure bottle 94 back to the first pressure valve.

At step 180, extruder unit 22 is in its "Recharge" phase. Pressure transducer 100 measures the pressure within piston chamber 42. If the measured value of the pressure within piston chamber 42 is not lower than the predetermined value, analog valve 104 does not open, and the method simply returns to step 150 for another injection cycle. However, if the measured value of the pressure within piston chamber 42 is lower than a predetermined value (indicating that pressure bottle 94 is now storing less than the first pressure value), the extruder unit 22 moves analog valve 104 to an at least a partially open position so that pressure bottle 94 is recharged back to its first pressure value. Once pressure bottle 94 is recharged, analog valve 104 is moved back to the closed position, and the method returns to step 150 for another injection cycle.

Although step 180 is illustrated as occurring after the recovery phase described in step 170, those of skill in the art will recognize that the measuring of pressure within piston chamber 42 can occur simultaneously with other steps of the method. Furthermore, the recharging of pressure bottle 94 by recharge bottle 102 can also occur simultaneously with other steps of the method.

In the previously illustrated embodiment, extruder unit 22 is adapted for "continuous" recovery, i.e., screw 30 continues to rotate and plasticize melt within barrel 28 throughout most or all of the inject and hold phases of the injection cycle. Those of skill in the art will recognize that the method described in steps 150 to 180 can also apply to extruder units that are adapted for "discontinuous" recovery, where the rotation of screw 30 and the plasticization of melt within barrel 28 is halted during the inject and hold phases of the injection cycle.

Figure 5:
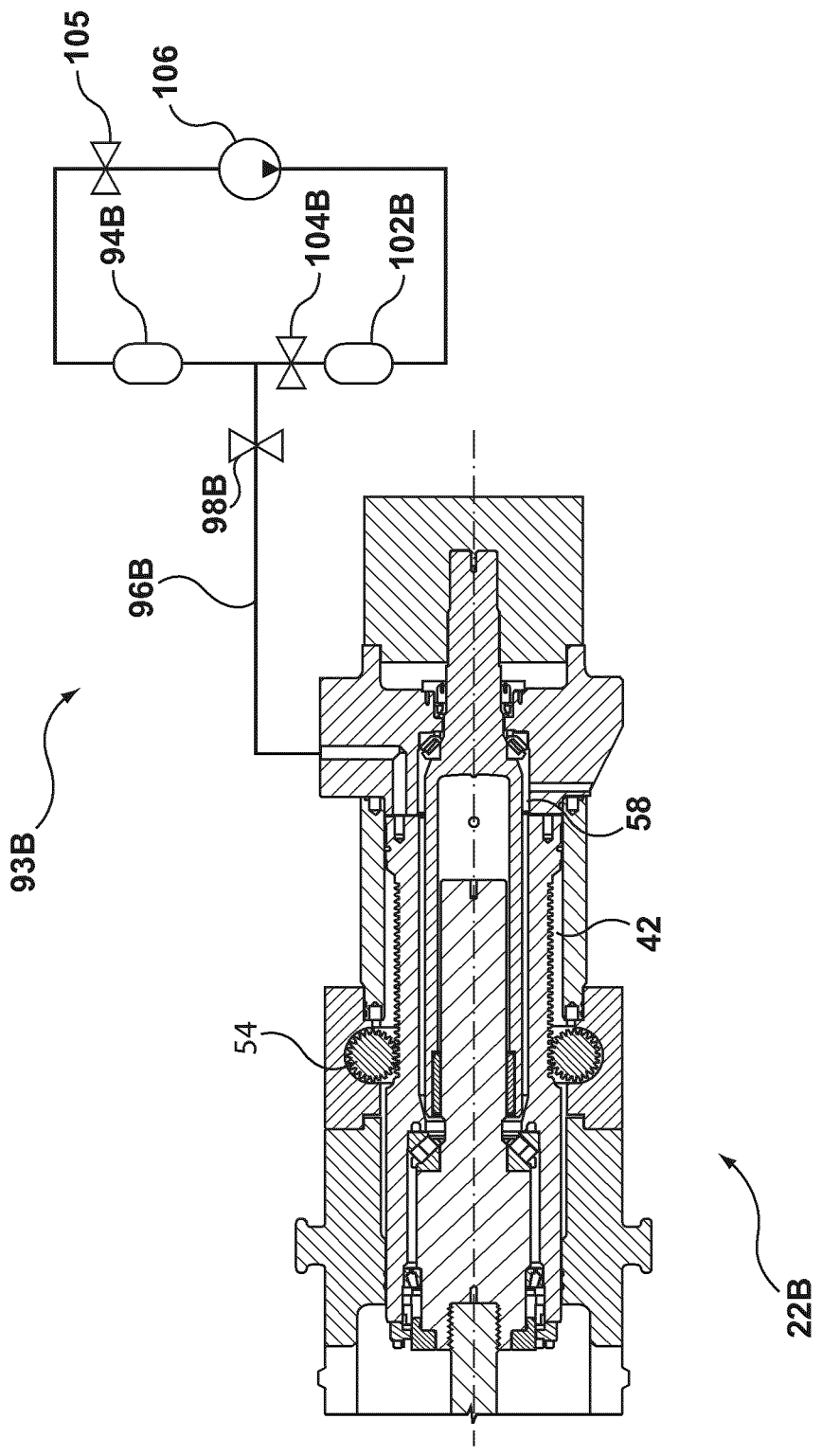
FIG. 5 is a top sectional view of another embodiment of an extruder unit for the injection molding system of FIG. 1.

Referring now to FIG. 5, another embodiment of an extruder unit is shown generally at 22B. Extruder unit 22B is similar to extruder unit 22, but is coupled to gas pressure unit 93B. Gas pressure unit 93B includes a conduit 96B in communication with a pressure bottle 94B and a recharge bottle 102B. Each of pressure bottle 94B and recharge bottle 102B are in selective communication with piston chamber 42 via the opening or closing of lock valve 98B and analog valve 104B, respectively. Gas conduit 96B further includes a pump 106. Pump 106 is a two-port pump with a first port in communication with pressure bottle 94B and a second port in communication with recharge bottle 102B. Pump 106 is typically engaged during the recovery phase to more rapidly lower the system pressure within piston chamber 42, allowing pinions 54 to operate more easily and/or rapidly. Gas pressure unit 93B further includes a supplemental lock valve 105. In the presently-illustrated embodiment, supplemental lock valve 105 is located between gas pressure bottle 94B and pump 106. Alternatively, the supplemental lock valve could be located on pump 106, between pump 106 and recharge bottle 102B, or located on either pressure bottle 94B or recharge bottle 102B (not shown).

During normal operation of extruder unit 22B and gas pressure unit 93B, supplemental lock valve 105 remains closed. Pump 106 could also be engaged to reduce the pressure settings in pressure bottle 94B or to perform maintenance work on pressure bottle 94B. Prior to removing the old pressure bottle 94B, supplemental lock valve 105 is opened and pump 106 is operated to substantially drain the bottle, with the nitrogen being stored and locked-in recharge bottle 102B by the closing of supplemental lock valve 105. After the maintenance operation is complete, supplemental lock valve 105 is closed again.

Figure 6:
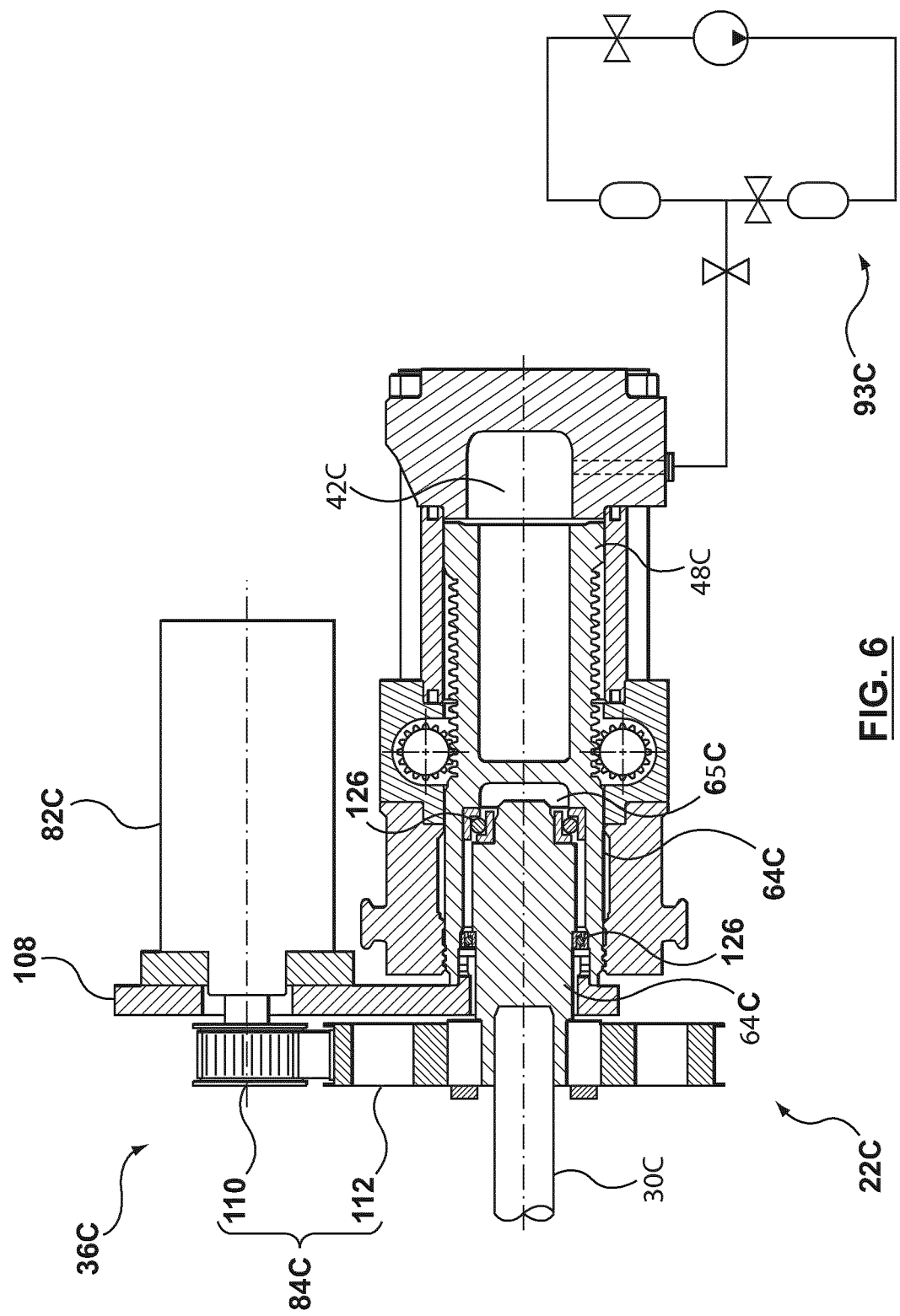
FIG. 6 is a top sectional view of another embodiment of an extruder unit for the injection molding system of FIG. 1.

Referring now to FIG. 6, another embodiment of an extruder unit is shown generally at 22C. Extruder unit 22C includes a motor support plate 108 that is attached to the rod end of piston 48C near the proximal end of screw 30C. Motor assembly 36C is mounted to motor support plate 108 and, in the currently-illustrated embodiment, is aligned to be parallel with the longitudinal axis of screw 30C. Motor assembly 36C includes an electric motor 82C that is adapted to rotate screw 30C via a transmission assembly 84C, which, as illustrated, includes a pulley 110 and a drive belt 112. Drive belt 112 is operably coupled to a screw adaptor 64C. Motor assembly 36C is translated by the movement of the piston 48C. Screw adaptor 64C is rotatably mounted via bearings 126 within a cavity section 65C on the piston 48C. Screw adaptor 64C does not include an extended shaft portion. Cavity section 65C is defined by piston 48C so as to not be in communication with the piston chamber 42C. The gas pressure unit 93C acts directly on piston chamber 42C, as is generally described above with respect to gas pressure unit 93B, and is thus not described in further detail.

Figure 7:
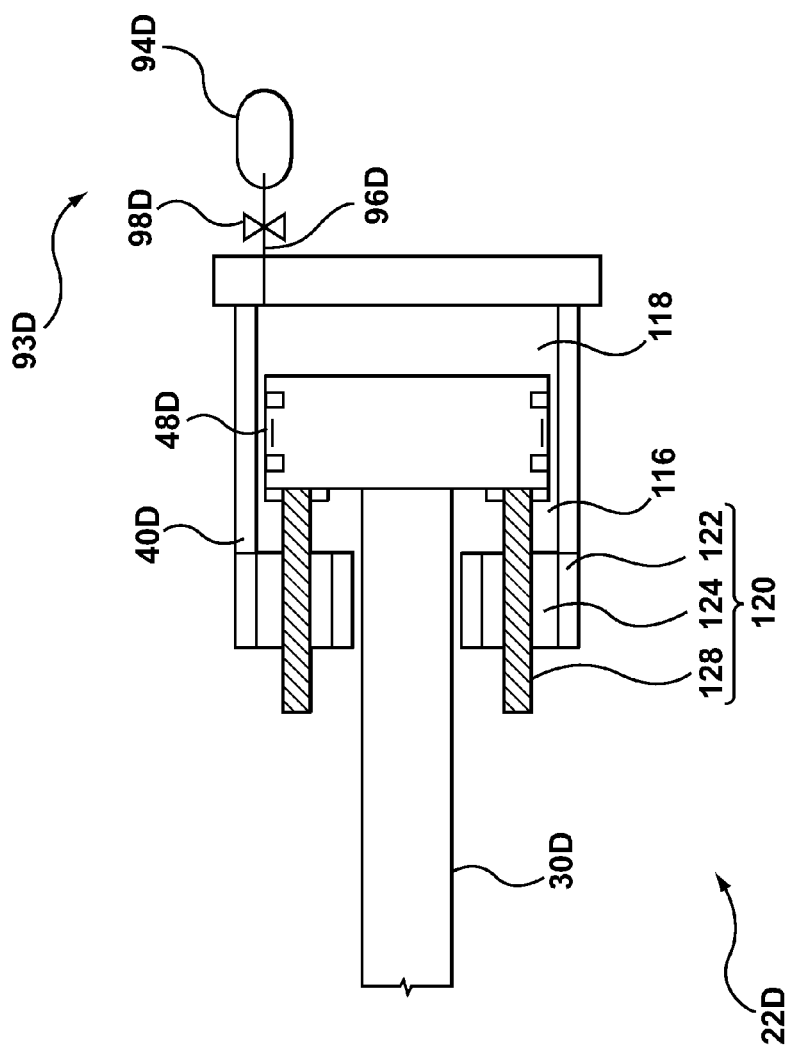
FIG. 7 is a top sectional view of another embodiment of an extruder unit for the injection molding system of FIG. 1.

Referring now to FIG. 7, another embodiment of an extruder unit is shown generally at 22D. Extruder unit 22D includes a piston housing 40D, and a piston 48D translatably mounted within. Screw 30D is rotatably mounted to the piston 48D. Pressure seals are provided within piston housing 40D. The rotation of screw 30D is not particularly limited, and can include rotation via a side-board motor assembly (not shown) akin to motor assembly 36C (FIG. 6), or an inline drive shaft (not shown) akin to drive shaft 88 on motor assembly 36 (FIGS. 2a and 2b-3a and 3b), both described above. Piston 48D subdivides the interior of piston housing 40D into a rod side 116 and a cylinder side 118. Cylinder side 118 is connected to a pressure unit 93D, which in the illustrated example is one or more pressure bottles 94D via a gas conduit 96D. A lock valve 98D is movable between an open position and the closed position to provide selective communication between pressure bottle 94D and cylinder side 118. When discharged, the gas pressure unit 93D applies pressure to cylinder side 118 to provide the boosting force.

Instead of using pinions as the primary motivator to translate the screw 30D, extruder unit 22D includes at least one ball screw assembly, and in the currently-illustrated embodiment, a pair of ball screw assemblies 120. Each ball screw assembly 120 includes a motor 122, a ball nut 124 that is rotatably mounted within piston housing 40D. Each extruder unit 22D further includes at least one threaded shaft 128 (one for each ball screw assembly 120) which extends through one of the ball nuts 124 and is mounted to piston 48D. By energizing the ball screw assemblies 120, piston 48D translates the attached screw 30D between its extended and retracted position.

It is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An extruder unit (22) for an injection molding system (20), comprising
   a barrel (28) containing a screw (30);
   a piston housing (40), connected to and in communication with the barrel (28), the piston housing (40) defining a piston chamber (42);
   a piston (48), slidably located within the piston chamber (42), and movable between a retracted position and an extended position; the piston (48) further being adapted to rotatably mount the screw (30);
   a motor assembly (36), mounted to the piston housing (40) and operable to rotate the screw (30); and
   a hybrid injection actuator (38), the hybrid injection actuator (38) including:
   a drive unit (50), the drive unit (50) being one of electrically driven and hydraulically driven and being operable to move the piston (48) between the retracted position and the extended position;
   a gas pressure unit (93), coupled to the piston chamber (42) via a gas conduit (96), the gas pressure unit (93) being operable to provide a boosting force to the piston (48) to urge the piston (48) towards the extended position; and
   a lock valve (98) located between the gas pressure unit (93) and the piston chamber (42), the lock valve (98) being movable between an open position and a closed position to provide a selective communication between the gas pressure unit (93) and the piston chamber (42).

2. The extruder unit (22) of claim 1, wherein the gas pressure unit (93) is operable to store a gas at a first pressure, the gas pressure unit (93) being in the selective communication with the piston chamber (42); and when opened, the gas pressure unit (93) is operable to release the gas stored at the first pressure to apply the boosting force to the piston (48), thereby urging the piston (48) towards the extended position.

3. The extruder unit (22) of claim 1, wherein the gas pressure unit (93) comprises:
   at least one pressure bottle (94), the at least one pressure bottle (94) being adapted to store a gas at a first pressure;
   the gas conduit (96), connecting the at least one pressure bottle (94) and the piston chamber (42); and
   the lock valve (98) on the at least one pressure bottle (94), the lock valve (98) being movable between the open position and the closed position to provide the selective communication between the at least one pressure bottle (94) and the piston chamber (42).

4. The extruder unit (22) of claim 1, wherein the gas pressure unit (93) comprises
   at least one pressure bottle (94), the at least one pressure bottle (94) being adapted to store a gas at a first pressure;
   the gas conduit (96), connecting the at least one pressure bottle (94) and the piston chamber (42);
   the lock valve (98) on the at least one pressure bottle (94), the lock valve (98) being movable between the open position and the closed position to provide the selective communication between the at least one pressure bottle (94) and the piston chamber (42); and
   moving the piston (48) from the extended position to the retracted position within the piston chamber (42) recharges the at least one pressure bottle (94) to the first pressure with the lock valve (98) in the open position.

5. The extruder unit (22) of claim 1, wherein the gas pressure unit (93) comprises at least one pressure bottle (94), the at least one pressure bottle (94) being adapted to store a gas at a first pressure;

at least one recharge bottle (102), the at least one recharge bottle (102) being adapted to store the gas at a second pressure, the second pressure being higher than the first pressure;

the gas conduit (96), connecting the at least one pressure bottle (94), and the piston chamber (42);

the lock valve (98) on the at least one pressure bottle (94), the lock valve (98) being movable between the open position and the closed position to provide the selective communication between the at least one pressure bottle (94) and the piston chamber (42); and a recharge valve on the at least one recharge bottle (102), the recharge valve being movable between the open position and the closed position; and wherein moving the recharge valve to the open position while the lock valve (98) is in the closed position restores a current pressure of the gas in the at least one pressure bottle (94) to the first pressure.

6. The extruder unit (22) of claim 5, wherein the recharge valve is an analog valve (104) operable to move to a position located between the open position and the closed position.

7. The extruder unit (22) of claim 5, wherein the gas pressure unit (93) further comprises a pump (106) for moving nitrogen from one of the at least one pressure bottle (94) and the at least one recharge bottle (102) to the other of the at least one pressure bottle (94) and the at least one recharge bottle (102).

8. The extruder unit (22) of claim 2, wherein the gas stored in the gas pressure unit (93) is a nitrogen gas.

9. The extruder unit (22) of claim 5, further comprising a pressure transducer (100) located within the piston housing (40), the pressure transducer (100) being operable to control the recharge valve based upon pressure readings within the piston chamber (42).

10. The extruder unit (22) of claim 5, wherein the at least one recharge bottle (102) can be one of refilled and replaced without interrupting operation of the injection molding system (20).

11. The extruder unit (22) of claim 1, wherein the drive unit (50) includes
at least one pinion (54) rotatably mounted within the piston housing (40), and operable to be at least one of electrically driven and hydraulically driven;
at least one rack portion (52) being defined by the piston (48) and intermeshing with the at least one pinion (54); and wherein
driving the at least one pinion (54) moves the piston (48) towards one of the extended position and the retracted position.

12. The extruder unit (22D) of claim 1, wherein the drive unit (50) includes:
at least one ball screw (30) assembly mounted within the piston housing (40), and operable to be one of electrically driven and hydraulically driven;
at least one threaded shaft (128), mounted to the piston (48), and intermeshing with the at least one ball screw (30) assembly; and wherein
driving the at least one ball screw (30) assembly moves the piston (48) towards one of the extended position and the retracted position.

13. The extruder unit (22C) of claim 1, wherein the motor assembly (36) includes:
a motor (122), mounted to the piston housing (40);
a gearbox (86), operably connected to the motor (122); and a drive shaft (88), operably connected to the gearbox (86) and extending through the piston housing (40) and into a rod chamber (58) defined by the piston (48);
a screw adaptor (64), rotatably mounted within the piston (48), the screw adaptor (64) being adapted to fixedly mount the screw (30), and
the screw adaptor (64) further being slidably located within and rotatable by the drive shaft (88).

14. The extruder unit (22C) of claim 1, wherein the motor assembly (36) includes:
a motor (122), mounted to the piston housing (40);
a gearbox (86), operably connected to the motor (122); and
a drive shaft (88), operably connected to the gearbox (86) and extending through the piston housing (40) and into a rod chamber (58) defined by the piston (48);
a screw adaptor (64), rotatably mounted within the piston (48), the screw adaptor (64) being adapted to fixedly mount the screw (30), and further being slidably located within and rotatable by the drive shaft (88); and wherein
one of the drive shaft (88) and the screw adaptor (64) defines at least one spline groove (92) and the other of the drive shaft (88) and the screw adaptor (64) defines at least one spline, the at least one spline groove (92) and the at least one spline being intermeshed so that rotation of the drive shaft (88) rotates the screw adaptor (64).

15. The extruder unit (22C) of claim 1, wherein the motor assembly (36) includes:
a motor (122), mounted to the piston (48);
a screw adaptor (64), rotatably mounted within the piston (48), and adapted to fixedly mount the screw (30); and
a drive belt (112), operably connected to the motor (122) and the screw adaptor (64), whereby engaging the motor (122) rotates the screw adaptor (64).

16. A method for operating an extruder unit (22) of an injection molding system (20) having a screw (30) rotatably mounted to a piston (48) movably located within a piston chamber (42) defined by a piston housing (40), comprising:
actuating the piston (48) located in the piston chamber (42) by engaging a drive unit (50) to translate the piston (48) to an extended position;
selectively connecting an external source of gas pressure to the piston chamber (42) by opening a lock valve (98) to provide a boosting force to the piston (48) while the screw (30) is being translated to the extended position by releasing a gas stored at a first pressure from the external source of gas pressure; and
retracting the screw (30) back to a retracted position using the drive unit (50); and
wherein retracting the screw (30) back to the retracted position within the piston chamber (42) recharges the external source of gas pressure back to the first pressure.

17. A hybrid injection actuator (38) for an extruder unit (22) of an injection molding system (20), comprising
a piston (48), slidably located within a piston chamber (42) on the extruder unit (22), and movable between a retracted position and an extended position; the piston (48) further being adapted to rotatably mount a screw (30);
a drive unit (50) operable to move the piston (48) between the retracted position and the extended position;
a gas pressure unit (93), operable to provide a boosting force to the piston (48), thereby urging the piston (48) towards the extended position; and
a lock valve (98) located between the gas pressure unit (93) and the piston chamber (42), the lock valve (98) being movable between an open position and a closed position to provide a selective communication between the gas pressure unit (93) and the piston chamber (42).

18. The hybrid injection actuator (38) of claim 17, wherein the gas pressure unit (93) is operable to store a gas at a first pressure, the gas pressure unit (93) being in selective communication with the piston chamber (42); and when opened, the gas pressure unit (93) is operable to release the gas stored at the first pressure to apply the boosting force to the piston (48), thereby urging the piston (48) towards the extended position.

19. The hybrid injection actuator (38) of claim 17, wherein the gas pressure unit (93) comprises at least one pressure bottle (94), the at least one pressure bottle (94) being adapted to store a gas at a first pressure;

at least one recharge bottle (102), the at least one recharge bottle (102) being adapted to store the gas at a second pressure, the second pressure being higher than the first pressure;

a gas conduit (96), connecting the at least one pressure bottle (94), and the piston chamber (42);

the lock valve (98) on the at least one pressure bottle (94), the lock valve (98) being movable between the open position and the closed position to provide a selective communication between the at least one pressure bottle (94) and the piston chamber (42); and a recharge valve on the at least one recharge bottle (102), the recharge valve being movable between an open position and the closed position; and wherein moving the recharge valve to the open position while the lock valve (98) is in the closed position restores a current pressure of the gas in the at least one pressure bottle (94) to the first pressure.

20. The hybrid injection actuator (38) of claim 19, wherein the gas pressure unit (93) further comprises a pump (106) for moving nitrogen from the at least one pressure bottle (94) to the at least one recharge bottle (102).

* * * * *